United States Patent
Coulter

(10) Patent No.: US 7,301,464 B2
(45) Date of Patent: Nov. 27, 2007

(54) PROCESS AND METHOD FOR SAFER VEHICLE NAVIGATION THROUGH FACIAL GESTURE RECOGNITION AND OPERATOR CONDITION MONITORING

(75) Inventor: Jeffery R. Coulter, Frisco, TX (US)

(73) Assignee: Electronic Data Systems Corporation, Plano, TX (US)

( * ) Notice: Subject to any disclaimer, the term of this patent is extended or adjusted under 35 U.S.C. 154(b) by 140 days.

(21) Appl. No.: 11/135,868

(22) Filed: May 24, 2005

(65) Prior Publication Data

US 2006/0267781 A1    Nov. 30, 2006

(51) Int. Cl.
G08B 23/00    (2006.01)

(52) U.S. Cl. ............... 340/573.7; 340/573.1; 340/575; 340/576; 701/11

(58) Field of Classification Search ............. 340/573.3, 340/575, 576, 573.7, 573.1, 539.18, 539.13, 340/988; 701/1, 2, 3, 11, 23, 200; 244/75.1, 244/76 R
See application file for complete search history.

(56) References Cited

U.S. PATENT DOCUMENTS

| | | | |
|---|---|---|---|
| 6,232,874 B1 | 5/2001 | Murphy | |
| 6,697,732 B1 | 2/2004 | Gotfried | |
| 6,734,799 B2 * | 5/2004 | Munch | 340/576 |
| 6,744,370 B1 * | 6/2004 | Sleichter et al. | 340/576 |
| 6,748,792 B1 | 6/2004 | Freund et al. | |
| 7,091,867 B2 * | 8/2006 | Wenstrand | 340/576 |
| 7,110,570 B1 * | 9/2006 | Berenz et al. | 382/104 |
| 2002/0084130 A1 | 7/2002 | Der Ghazarian et al. | |
| 2002/0097145 A1 | 7/2002 | Tumey et al. | |
| 2003/0146841 A1 | 8/2003 | Koenig | |
| 2005/0030184 A1 | 2/2005 | Victor | |

FOREIGN PATENT DOCUMENTS

GB    2375909 A    11/2002

OTHER PUBLICATIONS

Pantic, et al., "Facial gesture recognition in face image sequences: A study on facial gesture typical for speech articulation", Man and Cybernetics (SMC '02), vol. 6, pp. 6 pages.

(Continued)

*Primary Examiner*—Davetta W. Goins
(74) *Attorney, Agent, or Firm*—Stephen R. Loe

(57) ABSTRACT

A vehicle operator condition monitoring system is provided. In one embodiment, the vehicle condition monitoring system includes a physical condition monitoring unit such as a camera, a data processing system, a navigation system, and a communication system. The physical condition monitoring unit is mounted in a vehicle to monitor at least one physical trait of a vehicle operator. The data processing system is coupled to the physical condition monitoring unit to compare data acquired by the physical condition monitoring unit with rules indicating types of action to be taken. The navigation system is functionally coupled to the data processing system allowing the data processing system to determine the location of the vehicle and the communications system is functionally coupled to the data processing system to allow the data processing system to contact an appropriate entity should the physical condition of the vehicle operator warrant such contact.

19 Claims, 7 Drawing Sheets

OTHER PUBLICATIONS

Zelinsky, et al., "Real-time visual recognition of facial gestures for human-computer interaction," IEEE 2nd International Conference on Automatic Face and Gesture Recognition (FG '96), Oct. 10-14, 1996, pp. 351-356.

Malciu, et al., "Tracking facial features in video sequences using a deformable model-based approach," Proceedings SPIE Conference on Mathematical Modeling, Estimation and Imaging, San Diego, CA, vol. 4121, Aug. 2000.

* cited by examiner

PROCESS AND METHOD FOR SAFER VEHICLE NAVIGATION THROUGH FACIAL GESTURE RECOGNITION AND OPERATOR CONDITION MONITORING

BACKGROUND OF THE INVENTION

1. Technical Field

The present invention relates to computer software and, more particularly, to vehicle technology to enhance the safety and convenience of vehicles, such as, automobiles.

2. Description of Related Art

Over the past century, automobiles have become a ubiquitous part of modern civilization. Evolutions in the design and manufacture of automobiles have created ever more reliable and safe vehicles for consumer's to drive and to travel in as passengers. As technology has advanced, automobile manufacturers have found ways of incorporating these advancing technologies into their products to improve safety, comfort, and convenience.

Thus, today's automobiles are equipped with some of the most advanced technologies available. For example, many automobiles include technologies like DVD-based navigation systems, hands-free communication systems, automatic distancing cruise control mechanisms, and even infrared technology to "see" objects at night. These technologies are used for convenience and safety purposes to meet the demands and expectations of consumers. Unfortunately, these systems act independently of one another, and do nothing to monitor the status of the driver.

Therefore, it would be desirable to have a system, method, and computer program that integrates various technologies incorporated within an automobile or other vehicle, such as, for example, plane, ship, train, or spaceship, with other technologies to monitor the status of the driver and, if needed, take appropriate action, such as, for example, to avoid a collision, and thus further enhance the safety and convenience of modern automobiles as well as other types of vehicles.

SUMMARY OF THE INVENTION

The present invention provides a vehicle operator condition monitoring system as well as a method, system, and computer program product for use in the vehicle operator condition monitoring system. In one embodiment, the vehicle condition monitoring system includes a physical condition monitoring unit such as a camera, a data processing system, a navigation system, and a communication system. The physical condition monitoring unit is mounted in a vehicle to monitor at least one physical trait of a vehicle operator. The data processing system is coupled to the physical condition monitoring unit to compare data acquired by the physical condition monitoring unit with rules indicating types of action to be taken. The navigation system is functionally coupled to the data processing system allowing the data processing system to determine the location of the vehicle and the communications system is functionally coupled to the data processing system to allow the data processing system to contact an appropriate entity should the physical condition of the vehicle operator warrant such contact.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention provides facial gesture recognition systems and driver physical condition monitoring systems that aid a driver of a vehicle in safer navigation of the vehicle. Use in conjunction with navigation and wireless communication systems, the facial gesture recognition systems and driver physical condition monitoring systems alert the driver to changes in the driver's condition that the driver may not be aware of that may effect the driver's ability to safely navigate the vehicle. The facial gesture recognition systems and driver physical condition monitoring systems also may provide the driver with directions to the nearest or preferred rest stop, hospital, restaurant, hotel, or other location of interest based on the perceived driver condition and the driver's instructions. Furthermore, the system of the present invention may make reservations at hotels, restaurants or contact emergency personnel if necessary and may take control of the vehicle and navigate it to a safe stop if the driver becomes incapable of operating the vehicle properly.

Figure 1A:
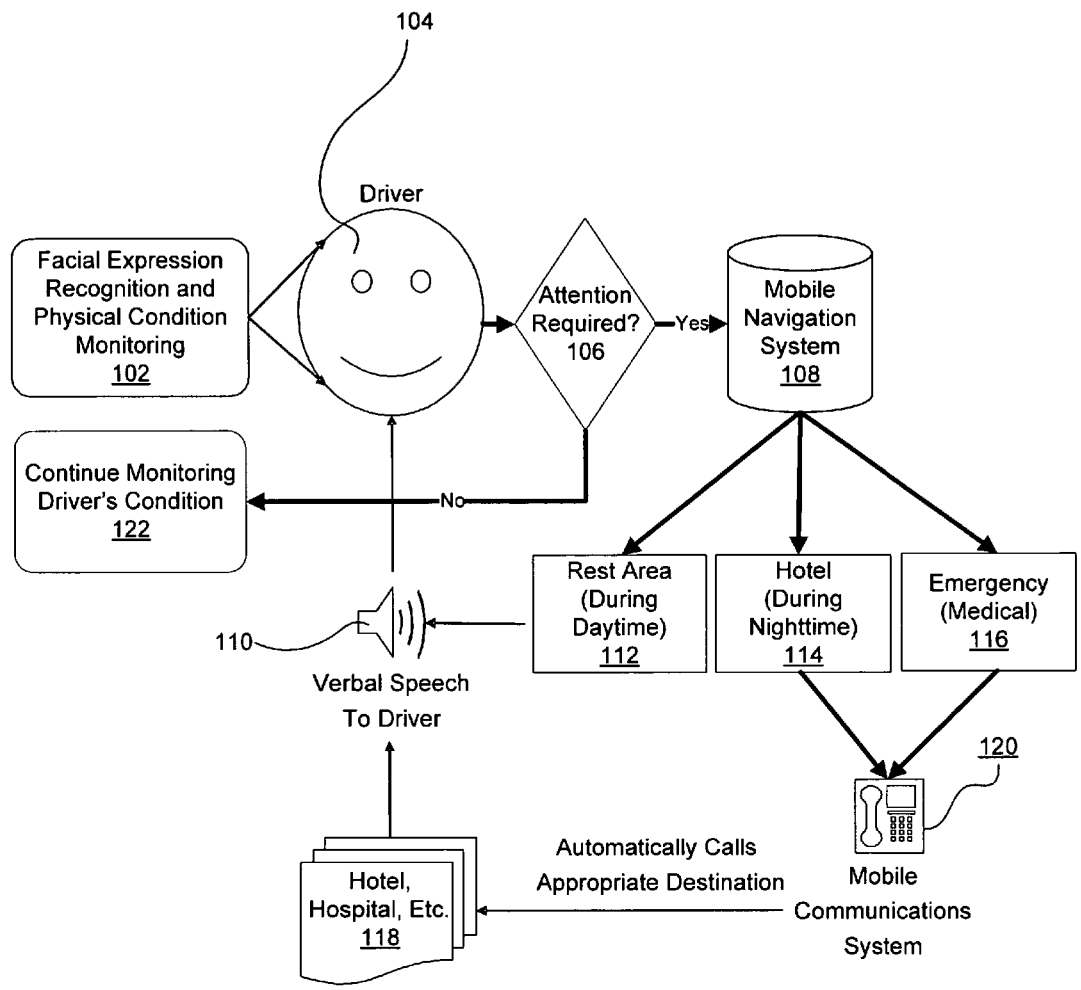
FIG. 1A depicts a pictorial diagram illustrating an exemplary method for driver facial gesture recognition and condition monitoring in accordance with one embodiment of the present invention.

With reference now to the figures, and in particular with reference to FIG. 1A, a pictorial diagram illustrating an exemplary method for driver facial gesture recognition and condition monitoring is depicted in accordance with one embodiment of the present invention. A facial Expression Recognition and physical condition monitoring unit 102 monitors a driver's 104 condition by employing facial expression recognition software which are available commercially and are well known in the art. If a driver condition monitoring system determines the attention is not required 106, the system continues to monitor the driver's condition 122. If, however, attention is required 106, the monitoring system, in one embodiment, utilizes a Mobile Navigation System 108 within the vehicle and then based on, for example, the location of the vehicle, the time of day, and the condition of the driver, performs an appropriate action.

For example, if it appears that the driver is having difficulty staying awake (e.g., the monitoring system has determined that the eyes will close for longer than required for a blink or that the driver's head keeps nodding) and it is in the daytime, the monitoring system may determine driving directions to the nearest rest area and, via the verbal speech engine 110 instruct the driver with instructions as to how to reach the rest area. Alternatively (or in addition to verbal directions), the monitoring system may display a map illustrating how to get to the rest area if the automobile is equipped with a video display terminal.

If it appears that the driver is having difficulty staying awake and it is in the evening or night, the monitoring system may determine the nearest hotel 114 utilizing the mobile navigation system 108 and automatically call the appropriate hotel 118 via a mobile communications system 120 and arrange for a reservation at the hotel. The type of hotel called may be preprogrammed by the driver so that if there are several options within a similar range, that a specified hotel chain, type, or having a specified cost range is contacted first. The system may call several hotels if the first choice is unable to accommodate the driver. In some embodiments, the system may query the driver to answer questions about which hotel the driver prefers from a list of hotel options.

As another example, it may be that the monitoring system determines that there is a medical emergency based on characteristics of the driver. In such case, the monitoring system may determine the location of the nearest emergency response team or hospital 116 utilizing the mobile navigation system 108 as an aid. The monitoring system may then contact the hospital or emergency response team 118 via mobile communications system 120 and notify the team or hospital of the vehicles location and requesting assistance. Depending on the type of monitoring equipment that the vehicle is equipped with, the monitoring system may also transmit various vital signs or characteristics of the driver (e.g., body temperature, pulse, respiratory rate, blood pressure, etc.) to the emergency response team.

Although such body characteristic monitoring devices (e.g., devices to measure pulse, body temperature, respiratory rate, blood pressure, blood sugar, etc.) may be impractical at the present because of requiring intrusive monitoring systems that interfere with driver comfort, such systems could nevertheless be incorporated into a driver monitoring system. Furthermore, the present invention is not limited to monitoring the condition of automobile drivers, but may be utilized to monitor the conditions of, for example, aircraft and helicopter pilots, astronauts, ship pilots and captains, truck drivers, bus drivers, train engineers, etc. Thus, in other applications where driver comfort is less of an issue and driver safety is a greater issue, such devices ma be utilized. Furthermore, as technology advances, it may be possible to monitor such conditions using much less intrusive methods than currently available (possibly without physically attaching any device to the driver). Thus, in such circumstances, it may be much more practicable to use such devices in conjunction with a driver condition monitoring system.

However, in any event, the driver condition monitoring system of the present invention is not limited to facial expression recognition or the physical condition monitoring devices that have been enumerated, but may be utilized with any system that measures some aspect of driver condition. It should also be noted that the types of actions taken by a driver condition monitoring system are not limited to those examples provided above regarding rest areas, hotels, and emergency teams. The possible actions taken by the monitoring system are myriad and many other possible uses will be recognized by those skilled in the art. For example, if the driver appears to be incapacitated, the monitoring system may be combined with the navigation system and equipment for controlling the speed and direction of the vehicle, thereby allowing the monitoring system and other systems to guide the vehicle to a safe stop in a safe location. The monitoring system may also be utilized in conjunction with other systems to try to rouse the driver or contact the driver if the driver appears not to be alert and if the driver responds sufficiently, then the monitoring system could resume simply monitoring without taking further action. For example, the monitoring system could invoke speech synthesizers to enquire of the driver as to whether the driver is okay and if the driver replies in the affirmative, then no further action need be taken.

Figure 1B:
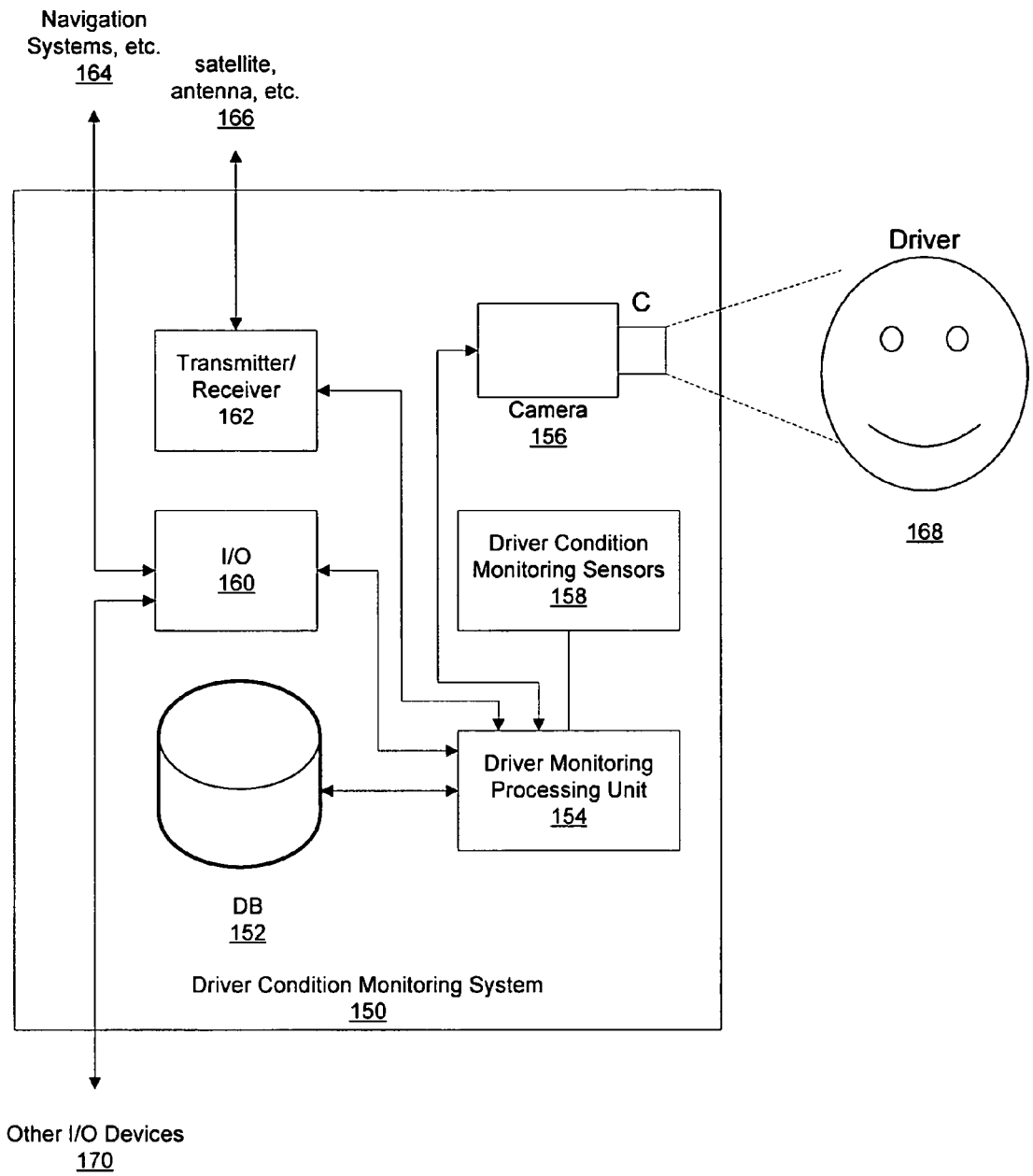
FIG. 1B depicts a block diagram illustrating an exemplary driver condition monitoring system in accordance with one embodiment of the present invention.

With reference now to FIG. 1B, a block diagram illustrating an exemplary driver condition monitoring system is depicted in accordance with one embodiment of the present invention.

Driver condition monitoring system 150 includes a camera 156 to provide images of the driver's 168 face to the driver monitoring processing unit 154. The driver monitoring processing unit 154 executes instructions for facial expression recognition software as well as the instructions of the driver condition monitoring system as to what actions to perform under various scenarios. The instructions executed by the driver monitoring processing unit 154 are stored in database 152. The driver monitoring processing unit 154 also receives input from navigation systems 164 and other similar devices via Input/Output (I/O) unit 160. Other I/O devices 170, such as, for example, microphones and speakers, are also connected to driver condition monitoring system 150 via I/O unit 160.

Should the driver condition monitoring system 150 need to communicate with a reservation system, emergency response network, or other entity, voice, simulated voice, and data are transmitted to and received through transmitter/receiver unit 162 which is coupled to a satellite or antenna 166.

In addition to a camera 156, driver condition monitoring system 150 may include other driver condition monitoring sensors 158 to provide other information about the condition of the driver. Such devices could include, for example, a device for measuring the driver's pulse (or heart rate), a blood pressure monitor, a blood sugar monitor, a driver temperature monitor, and a driver respiratory rate monitor. This list, however, is not exclusive, but is merely illustrative of other such driver monitoring devices.

In addition to monitoring the driver condition, the driver condition monitoring system 150 may also perform as an antitheft device. For example, facial scans may be taken of all drivers authorized to drive the vehicle and if a person attempts to driver the vehicle whose facial features do not match one of the designated drivers, the driver condition monitoring system 150 could perform various theft deterrence actions. For instance, the system 150 could cut the power, lock the doors, and contact an appropriate emergency response entity informing them of the attempted theft and the location of the vehicle.

Driver condition monitoring system 150 is provided merely as an example of a driver condition monitoring system and not as an architectural limitation for the processes of the present invention.

Figure 2:
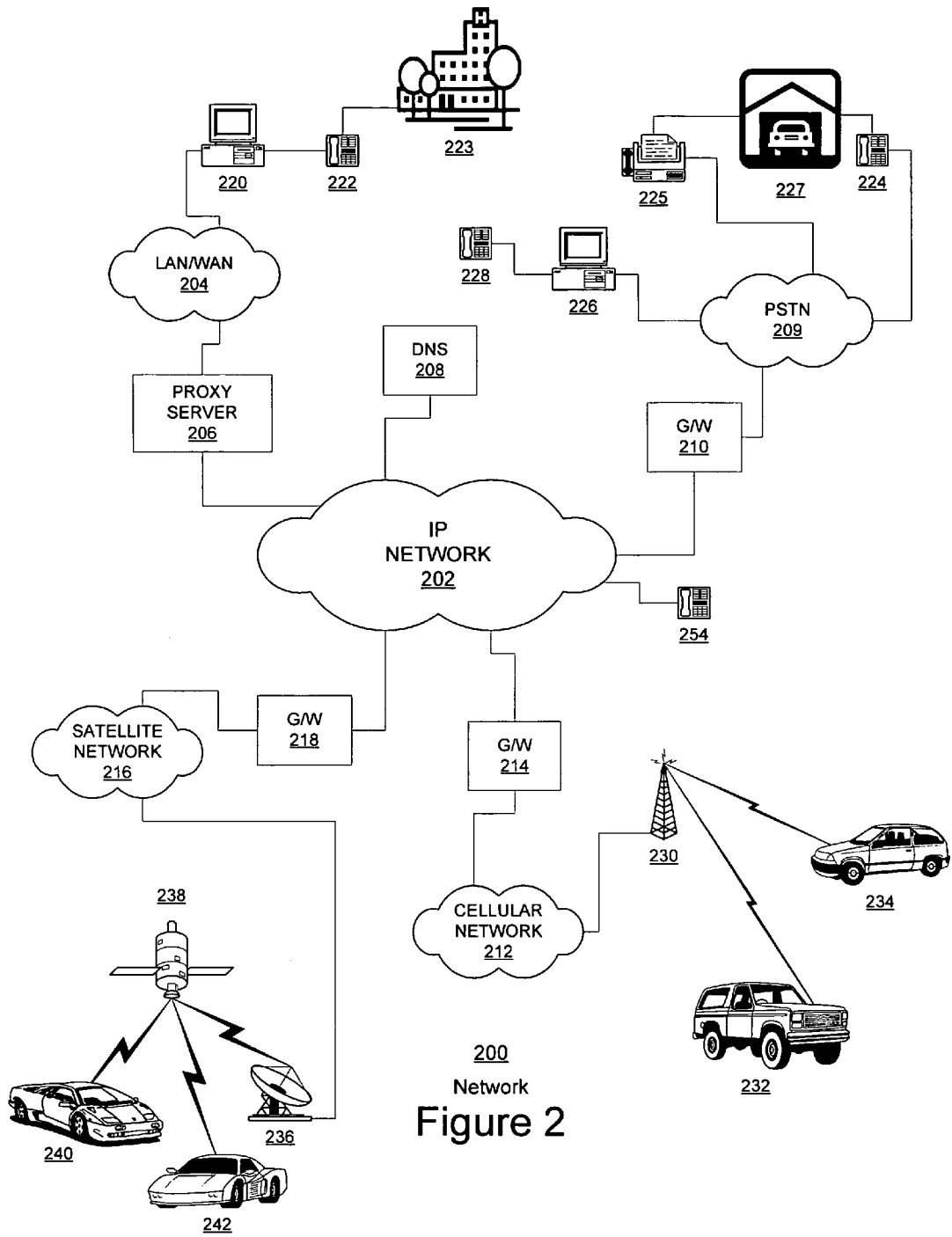
FIG. 2 depicts a system diagram illustrating a communications network in which the present invention may be implemented.

With reference now to FIG. 2, a system diagram illustrating a communications network in which the present invention may be implemented is depicted. Communications network 200 is a plurality of interconnected heterogeneous networks in which the present invention may be implemented thereby allowing vehicle operators and/or vehicle operator monitoring systems within vehicles to communicate with appropriate entities to aid in rectifying less than optimal vehicle operator conditions.

As illustrated, communications network 200 contains an Internet Protocol (IP) network 202, a Local Area Network (LAN)/Wide Area Network (WAN) 204, the Public Switched Telephone Network (PSTN) 209, cellular wireless networks 212 and 213, and a satellite communication network 216. Networks 202, 204, 209, 212, 213 and 216 may include permanent connections, such as wire or fiber optic cables, or temporary connections made through telephone connections.

IP network 202 may be the publicly available IP network (the Internet), a private IP network, or a combination of public and private IP networks. In any case, IP network 202 operates according to the Internet Protocol and routes packets among its many switches and through its many transmission paths. IP networks are generally known in the art to be expandable, fairly easy to use and heavily supported. Coupled to IP network 202 is a Domain Name Server (DNS) 208 to which queries may be sent, such queries each requesting an IP address based upon a Uniform Resource Locator (URL). IP network 202 supports 32 bit IP addresses as well as 128 bit IP addresses, which are currently in the planning stage.

LAN/WAN 204 couples to IP network 202 via a proxy server 206 (or another connection). LAN/WAN 204 may operate according to various communication protocols, such as the Internet Protocol, the Asynchronous Transfer Mode (ATM) protocol, or other known packet switched protocols. Proxy server 206 serves to route data between IP network 202 and LAN/WAN 204. A firewall that precludes unwanted communications from entering LAN/WAN 204 may also be located at the location of proxy server 206.

Computer 220 couples to LAN/WAN 204 and supports communications with LAN/WAN 204. Computer 220 may employ the LAN/WAN and proxy server 206 to communicate with other devices across IP network 202. Such communications are generally known in the art and will not be further described herein except to expand upon the teachings of the present invention. As is also shown, phone 222 couples to computer 220 and may be employed to initiate IP Telephony communications with another phone or voice terminal using IP Telephony. An IP phone 254 connected to IP network 202 (or other phone, e.g., phone 224) may communicate with phone 222 using IP telephony. Computer 220 and telephone 222 may be utilized by, for example, hospital 223 to allow for communications with inbound emergency response vehicles or with persons in need of assistance.

PSTN 209 is a circuit switched network that is primarily employed for voice communications, such as those enabled by a standard phone 224. However, PSTN 209 also supports the transmission of data. PSTN 209 may be connected to IP Network 202 via Gateway 210. Data transmissions may be supported to a tone based terminal, such as a FAX machine 225, to a tone based modem contained in computer 226, or to another device that couples to PSTN 209 via a digital connection, such as an Integrated Services Digital Network (ISDN) line, an Asynchronous Digital Subscriber Line (ADSL), IEEE 802.16 broadband local loop, or another digital connection to a terminal that supports such a connection. Telephone 224 and fax machine 225 may connect an emergency response center 227 allowing the center 227 to communicate with dispatchers or with persons in need of assistance.

As illustrated, a voice terminal, such as phone 228, may couple to PSTN 209 via computer 226 rather than being supported directly by PSTN 209, as is the case with phone 224. Thus, computer 226 may support IP telephony with voice terminal 228, for example. Computer 226 may be utilized by, for example, a reservation system supporting a hotel or motel chain or and emergency system dispatcher dispatching appropriate emergency responders from emergency response center 227.

Cellular networks 212 and 213 support wireless communications with terminals operating in their service area (which may cover a city, county, state, country, etc.). Each of cellular networks 212 and 213 may operate according to a different operating standard utilizing a different frequency (e.g., 850 and 1900 MHz) as is discussed in more detail below. Cellular networks 212 and 213 include a plurality of towers, e.g., 230, that each provide wireless communications within a respective cell. Wirelessly enabled vehicle mounted data processing systems that may operate in conjunction with cellular network 212 include those incorporated within vehicles 232 and 234, for example. For example, the wirelessly enabled data processing system within vehicle 232 may operate via a TDMA/GSM standard while the wirelessly enabled data processing system within vehicle 233 may operate via a UMTS standard. The wirelessly enabled vehicle mounted data processing systems may incorporate a driver facial expression recognition and driver condition monitoring system or be coupled to one such that if the driver becomes incapacitated or is otherwise in need of assistance, that the system may communicate with emergency response teams, navigation systems, hospitals, reservation systems, or other entity as the condition may warrant. Cellular network 212 couple to IP network 202 via gateway 214.

Vehicles 232 and 234 may also communicate with cellular network 212 using a wireless application protocol (WAP). WAP is an open, global specification that allows mobile users with wireless devices, such as, for example, mobile phones, pagers, two-way radios, smart phones, communicators, personal digital assistants, and portable laptop computers, to easily access and interact with information and services almost instantly. WAP is a communications protocol and application environment and can be built on any operating system including, for example, Palm OS, EPOC, Windows CE, FLEXOS, OS/9, and JavaOS. WAP provides interoperability even between different device families.

WAP is the wireless equivalent of Hypertext Transfer Protocol (HTTP) and Hypertext Markup Language (HTML). The HTTP-like component defines the communication protocol between the handheld device and a server or gateway. This component addresses characteristics that are unique to wireless devices, such as data rate and round-trip response time. The HTML-like component, commonly known as Wireless Markup Language (WML), defines new markup and scripting languages for displaying information to and interacting with the user. This component is highly focused on the limited display size and limited input devices available on small, handheld devices. For example, a typical cell phone may have only a 4×10-character display with 26-gray levels and only a numeric keypad plus up/down volume keys.

Cellular network 212 operates according to an operating standard, which may be, for example, an analog standard (e.g., the Advanced Mobile Phone System (AMPS) standard), a code division standard (e.g., the Code Division Multiple Access (CDMA) standard), a time division standard (e.g., the Time Division Multiple Access (TDMA) standard), a frequency division standard (e.g. the Global System for Mobile Communications or Groupe Speciale Mobile (GSM)), or any other appropriate wireless communication method. Independent of the standard(s) supported by cellular network 212, cellular network 212 supports voice and data communications with vehicles, e.g., 232 and 234.

Satellite network 216 includes at least one satellite dish 236 that operates in conjunction with a satellite 238 to provide satellite communications with a plurality of vehicles, e.g., vehicles 240 and 242 equipped with satellite enabled data processing systems incorporating facial and physical condition monitoring systems which may aid the driver when the physical state of the driver appears to warrant intervention. Satellite network 216 may be serviced by one or more geosynchronous orbiting satellites, a plurality of medium earth orbit satellites, or a plurality of low earth orbit satellites. In any case, satellite network 216 services voice and data communications and couples to IP network 202 via gateway 218.

FIG. 2 is intended as an example and not as an architectural limitation for the processes of the present invention. For example, communications system 200 may include additional servers, clients, and other devices not shown. Other interconnections are also possible. For example, if vehicles 232 and 234 were GPS-enabled, they could interact with satellite 238 either directly or via cellular networks 212 and 213.

Figure 3:
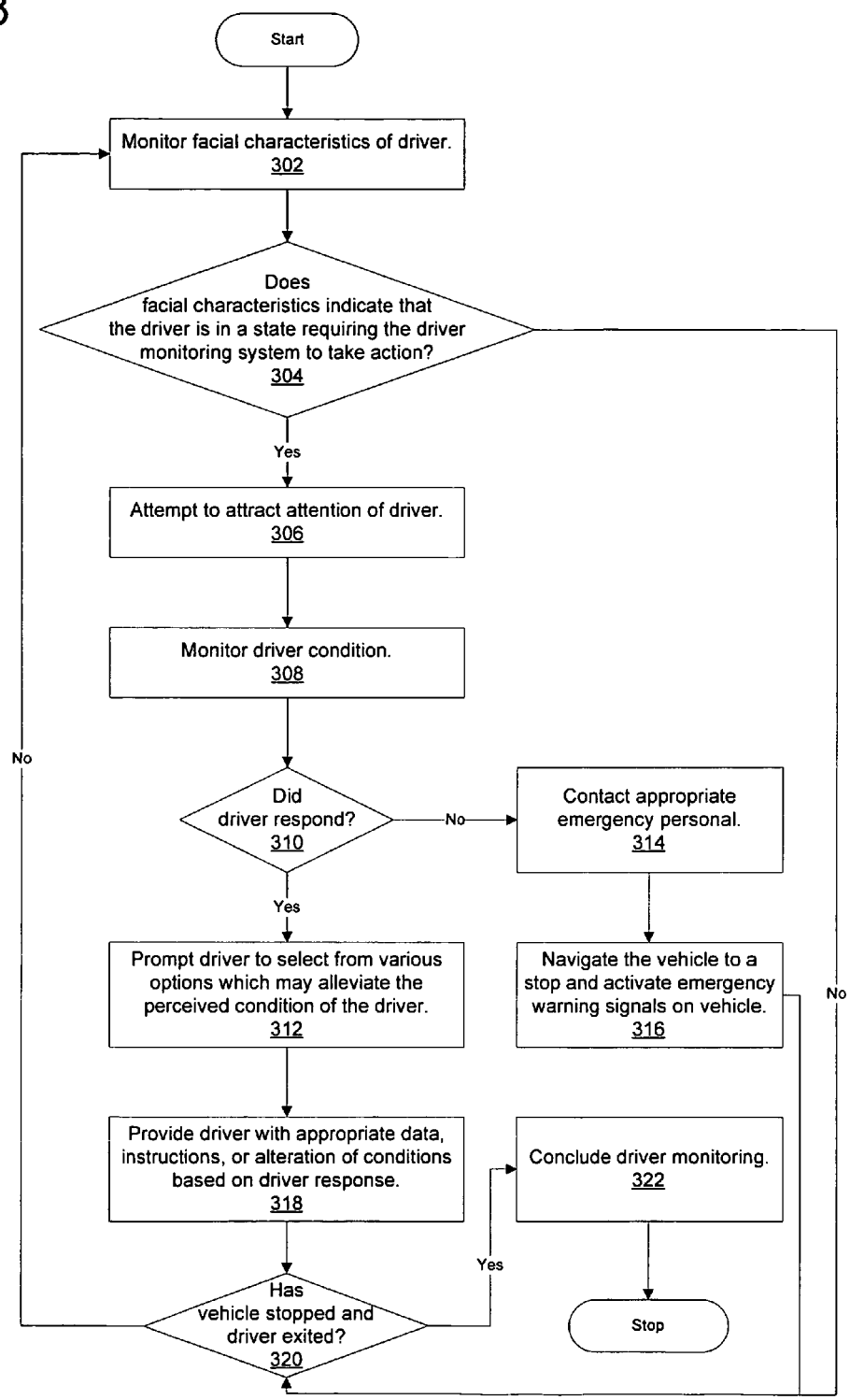
FIG. 3 depicts a diagram illustrating an exemplary process flow and program function for monitoring the facial expression of a driver in accordance with one embodiment of the present invention.

With reference now to FIG. 3, a diagram illustrating an exemplary process flow and program function for monitoring the facial expression of a driver is depicted in accordance with one embodiment of the present invention.

In this embodiment, a driver condition monitoring system monitors facial characteristics of a driver (step 302) and determines whether the facial characteristics indicate that the driver is in a state that requires the driver monitoring system to take action (step 304). If the no, then the monitoring system determines whether the vehicle has stopped and driver has exited (step 320). If the vehicle is stopped and the driver has exited, then the monitoring system concludes driver monitoring (step 322). If the vehicle is not stopped or the driver has not exited the vehicle, then the monitoring system continues to monitor facial characteristics of the driver (step 302).

If, on the other hand, after monitoring facial characteristics of the driver (step 302), the monitoring system determines that the facial characteristics of the driver indicate that the driver is in a state requiring the monitoring system to take action, then the monitoring system attempts to attract the attention of the driver (step 306) by, for example, asking "Are you OK?" to the driver through a speech synthesis system. The monitoring system then continues to monitor the driver's condition (step 308) and determines whether the driver responded (step 310). If the driver did respond with a satisfactory answer or action, then the monitoring system prompts the driver to select from various options which may alleviate the perceived condition of the driver (step 312). For example, the monitoring system may prompt the driver as to whether the driver wishes the monitoring system to contact and make reservations at a nearby hotel so that the driver may rest. Once the driver has responded to the prompt, the monitoring system provides the driver with appropriate data, instructions, or alteration of conditions or contacts an appropriate entity based on the driver response (step 318). The monitoring system then determines whether the vehicle has stopped and the driver has exited (step 320). If yes, then the monitoring system concludes driver monitoring (step 322). If no, then the monitoring system continues to monitor facial characteristics of the driver (step 302).

If after attempting to attract the attention of the driver (step 306), the monitoring system determines that the driver did not respond satisfactorily, then the monitoring system contacts an appropriate emergency response entity in the area (step 314) notifying the entity that there is a possible emergency, that medical attention may be required, and informing the entity as to the location of the vehicle (step 316). The monitoring system then, if the vehicle is properly equipped, navigates the vehicle to a safe stop and activates the emergency warning signals on the vehicle (step 316). The monitoring system may then continue to maintain contact with the emergency services entity until they arrive on the scene and deactivate the system or may merely continue to monitor the driver until the driver has exited the vehicle.

FIG. 3 is intended as an example and not as an architectural limitation for the processes of the present invention.

Figure 4:
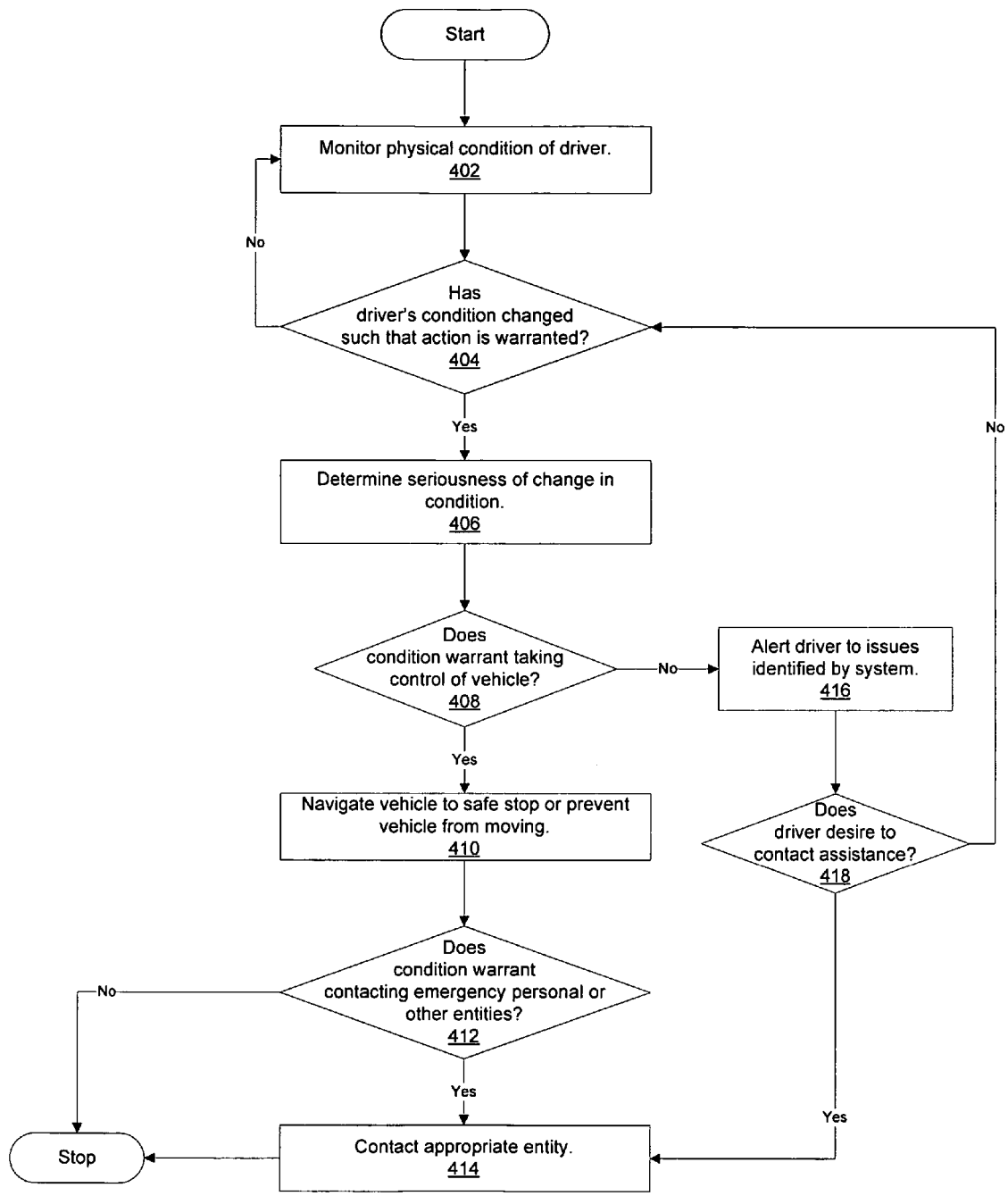
FIG. 4 depicts a diagram illustrating an exemplary process flow and program function for monitoring the condition of a driver in accordance with one embodiment of the present invention.

With reference now to FIG. 4, a diagram illustrating an exemplary process flow and program function for monitoring the condition of a driver is depicted in accordance with one embodiment of the present invention.

In this embodiment, the monitoring system monitors the physical condition of the driver (step 402). For example, the monitoring system may monitor one or more of the pulse, blood pressure, blood sugar level, blood alcohol level, respiratory rate, pupil dilation, eye movement, and body temperature to determine whether the driver is impaired. Based on the measurements obtained in monitoring the driver's physical condition, the monitoring system determines whether the driver's condition has changed such that action is warranted (step 404). If not, then the monitoring system continues to monitor the physical condition of the driver (step 402). However, if the condition of the drive has changed such that action is warranted, then the monitoring system determines the seriousness of the change in condition (step 406) and determines whether the condition warrants taking control of the vehicle (step 408). If the condition does not warrant taking control of the vehicle, then the monitoring system alerts the driver to the issues identified by the system (step 416) and determines whether the driver desires the monitoring system to contact assistance (step 418). If the driver does wish to contact assistance, then the monitoring system contacts the appropriate entity (step 414). If the driver does not require assistance, then the monitoring system continues to monitor the physical condition of the driver (step 402).

If after determining the seriousness of the change in the driver's physical condition, the system determines that the condition warrants taking control of the vehicle, the monitoring system navigates the vehicle to a safe stop or, if the vehicle has not moved, prevents the vehicle from moving (step 410). The monitoring system then determines whether the condition warrants contacting emergency personal or other entities (step 412) and, if so, contacts the appropriate entity (step 414).

FIG. 4 is intended as an example and not as an architectural limitation for the processes of the present invention.

Figure 5:
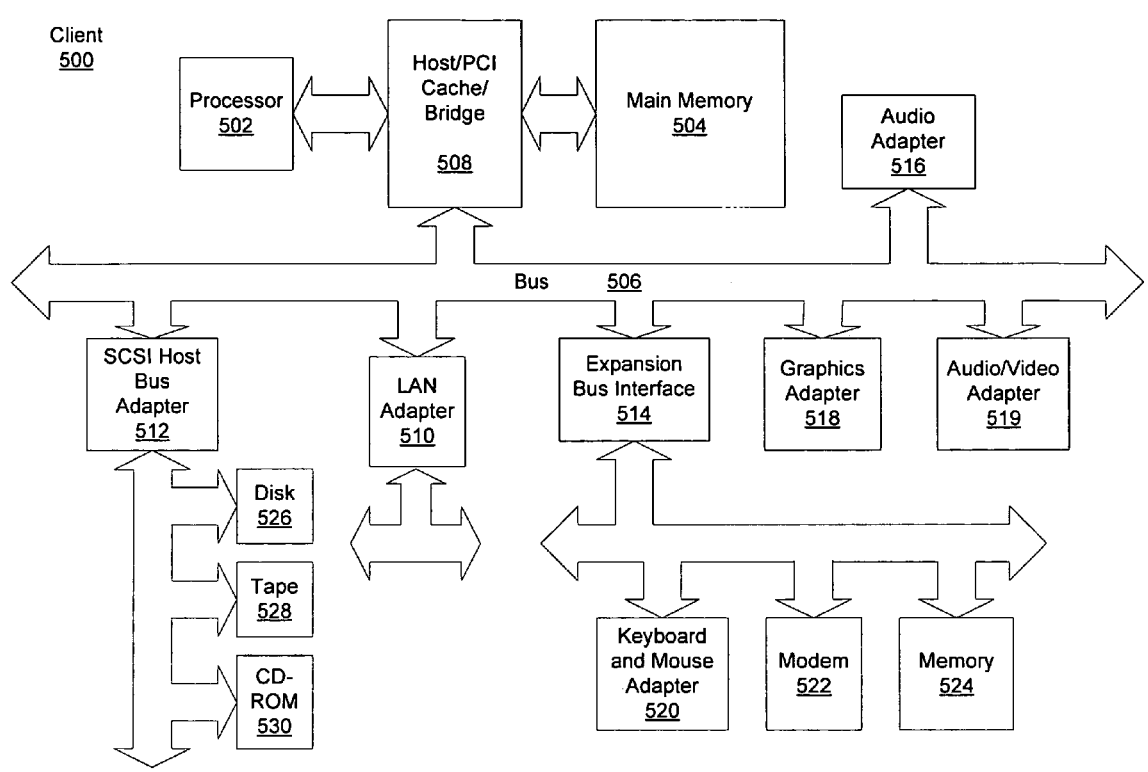
FIG. 5 depicts a block diagram of a data processing system in which the present invention may be implemented.

With reference now to FIG. 5, a block diagram of a data processing system in which the present invention may be implemented is illustrated. Data processing system 500 is an example of a computer that could be implemented within a vehicle, such as, for example, any of vehicles 232, 234, 240, and 242 depicted in FIG. 2, in order to implement a driver condition monitoring system, such as the driver condition monitoring system 150 depicted in FIG. 1B with the addition of course of cameras or other driver condition monitoring equipment, and execute the programs, processes, and systems of the navigation assistant of the present invention as well as other processes. Alternatively, data processing system 500 could be implemented as computer 220 or 226 depicted in FIG. 2 thereby providing, for example, emergency response dispatch functions or hotel reservation functions.

Data processing system 500 employs a peripheral component interconnect (PCI) local bus architecture. Although the depicted example employs a PCI bus, other bus architectures, such as Micro Channel and ISA, may be used. Processor 502 and main memory 504 are connected to PCI local bus 506 through PCI bridge 508. PCI bridge 508 may also include an integrated memory controller and cache memory for processor 502. Additional connections to PCI local bus 506 may be made through direct component interconnection or through add-in boards. In the depicted example, local area network (LAN) adapter 510, SCSI host bus adapter 512, and expansion bus interface 514 are connected to PCI local bus 506 by direct component connection. In contrast, audio adapter 516, graphics adapter 518, and audio/video adapter (A/V) 519 are connected to PCI local bus 506 by add-in boards inserted into expansion slots. Expansion bus interface 514 provides a connection for a keyboard and mouse adapter 520, modem 522, and additional memory 524. In the depicted example, SCSI host bus adapter 512 provides a connection for hard disk drive 526, tape drive 528, CD-ROM drive 530, and digital video disc read only memory drive (DVD-ROM) 532. Typical PCI local bus implementations will support three or four PCI expansion slots or add-in connectors.

A video display (not shown) may be connected to graphics adapter 518. The video display may provide the driver of the vehicle with a map and directions to points of interest and may also provide the driver with other information as desired in the particular implementation. The display may be, in some embodiments, equipped with touch screen technology allowing a user to enter input by touching various points on the screen as prompted by the data processing system 500.

One or more speakers may be connected to audio adapter 516 allowing, among other things, for the computer 500 to communicate output to the driver. A speaker may also be connected to audio adapter 516 allowing the driver to input data into the computer via voice or other audio means. In such case, the computer 500 would typically incorporate voice speech recognition software in order to interpret the requests of the driver. Such speech recognition software is well known in the art.

An operating system runs on processor 502 and is used to coordinate and provide control of various components within data processing system 500 in FIG. 5. The operating system may be a commercially available operating system, such as Windows XP, which is available from Microsoft Corporation of Redmond, Wash. "Windows XP" is a trademark of Microsoft Corporation or may be another system developed specifically for the needs of vehicles, such as automobiles. An object oriented programming system, such as Java, may run in conjunction with the operating system, providing calls to the operating system from Java programs or applications executing on data processing system 500. Instructions for the operating system, the object-oriented operating system, and applications or programs are located on a storage device, such as hard disk drive 526, and may be loaded into main memory 504 for execution by processor 502.

Those of ordinary skill in the art will appreciate that the hardware in FIG. 5 may vary depending on the implementation. For example, other peripheral devices, such as optical disk drives and the like, may be used in addition to or in place of the hardware depicted in FIG. 5. The depicted example is not meant to imply architectural limitations with respect to the present invention. For example, the processes of the present invention may be applied to multiprocessor data processing systems.

Figure 6:
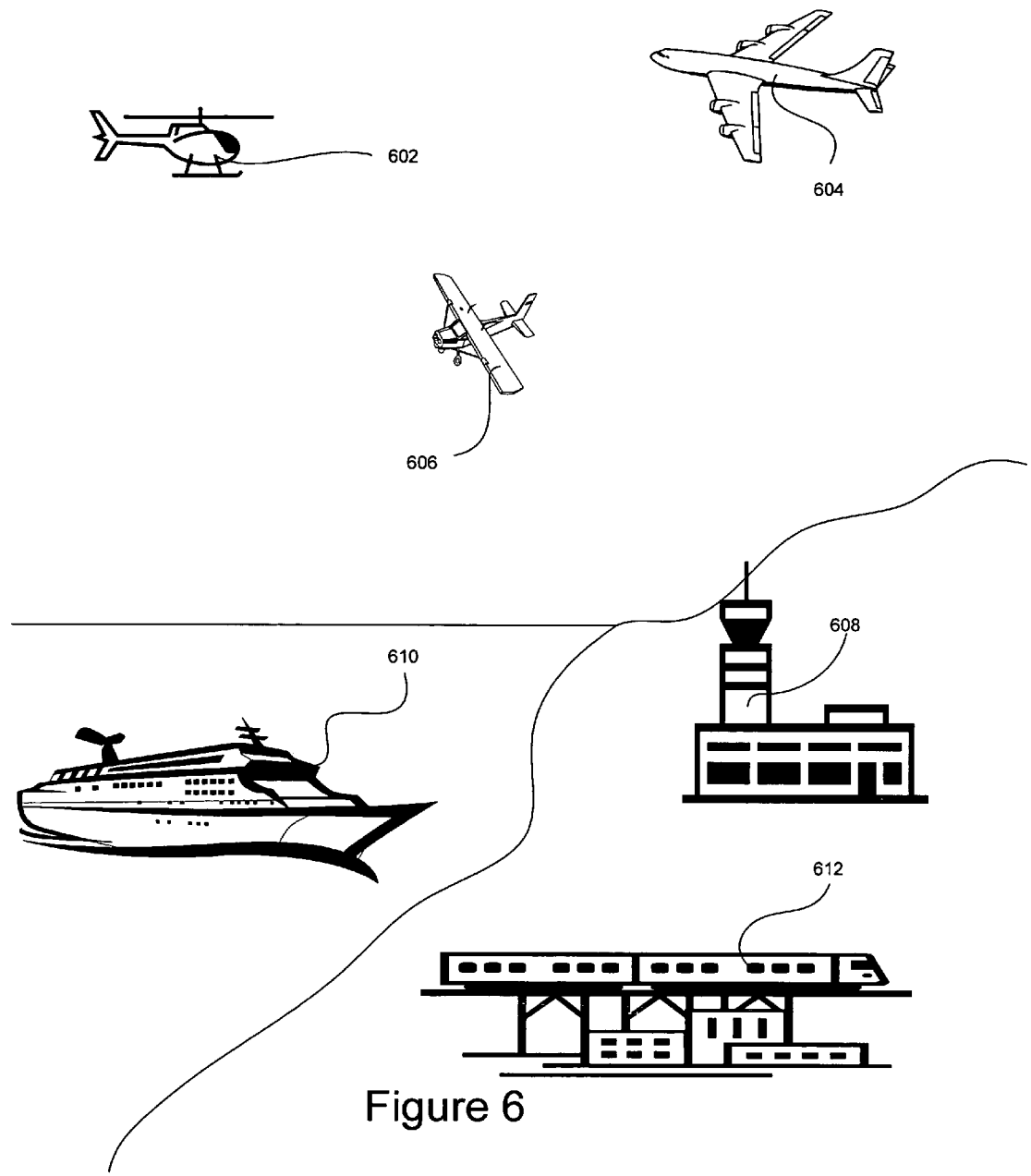
FIG. 6 depicts a pictorial diagram illustrating various vehicles in which a driver (or vehicle operator) condition monitoring system may be implemented in accordance with one embodiment of the present invention.

With reference now to FIG. 6, a pictorial diagram illustrating various vehicles in which a driver (or vehicle operator) condition monitoring system may be implemented is depicted in accordance with one embodiment of the present invention.

In FIG. 6, the vehicle operator condition monitoring system may be incorporated into a commercial jet liner 604, a private aircraft 606, or a helicopter 602 with some of the operator condition information transmitted to the air traffic control tower 608. Autopilots or other instrumentation may be utilized in conjunction with the vehicle operator condition monitoring system to safely navigate the air craft or other vehicle type safely until the operator's condition has been restored or to possibly land the air craft should conditions warrant. Of course many other actions may be performed as well as those skilled in the art will recognize.

In addition to utilization of the vehicle operator condition monitoring system with air craft, the system may also be utilized in conjunction with ships 610 and other water craft as well as trains 612. In addition to the types of vehicles listed, the vehicle operator condition monitoring system may be utilized with other vehicles as well including, for example, space craft. Thus, the present invention is not limited to any particular type of vehicle but may be utilized in any vehicle that requires a human operator. However, the types of actions taken may vary depending on the type of vehicle as those skilled in the art will recognize.

More information about facial gesture recognition may be found in "Facial Gesture Recognition in Face Image Sequences: A study on Facial Gestures Typical for Speech Articulation" by M. Pantic and L. J. M. Rothkrantz published in *IEEE International Conference on Systems, Man and Cybernetics (SMC '02)*, vol. 6, pp. 6 pages, October 2002; "Real-Time Visual Recognition of Facial Gestures for Human-Computer Interaction" by Alexander Zelinsky and Jochen Heinzmann published in *IEEE $2^{nd}$ International Conference on Automatic Face and Gesture Recognition (FG '96)*, Oct. 10-14, 1996, pp. 351-356; and "*Tracking Facial Features in Video Sequences Using a Deformable Model-Based Approach*" by Marius Malciu and Francoise Prêteux published in *Proceedings SPIE Conference on Mathematical Modeling, Estimation and Imaging*, San Diego, Calif., Vol. 4121, August 2000. The aforementioned publications are all hereby incorporated herein by reference for all purposed.

To aid the Patent Office, and any readers of any patent issued on this application in interpreting the claims appended hereto, it is noted that applicant does not intend any of the appended claims to invoke paragraph 6 of 35 U.S.C. § 212 as it exists on the date of filing unless the words "means for" are used in the particular claim. Furthermore, none of the description in the present application should be read as implying that any particular element, step, or function is an essential element which must be included in the claim scope: THE SCOPE OF THE PATENTED SUBJECT MATTER IS DEFINED ONLY BY THE ALLOWED CLAIMS. Thus, the extent of legal protection will be determined by the limitations recited in the allowed claims and their equivalents. Unless explicitly recited, other aspects of the present invention as described in this specification do not limit the scope of the claims.

As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A vehicle operator condition monitoring system, the system comprising:
    a physical condition monitoring unit mounted in a vehicle to monitor at least one physical trait of a vehicle operator;
    a data processing system coupled to the physical condition monitoring unit to compare data acquired by the physical condition monitoring unit with rules indicating types of action to be taken;
    a navigation system functionally coupled to the data processing system allowing the data processing system to determine the location of the vehicle;
    a communications system functionally coupled to the data processing system allowing the data processing system to contact an appropriate entity should the physical condition of the vehicle operator warrant said contact; and
    a vehicle piloting system functionally coupled to the data processing system wherein the vehicle piloting system allows the data processing system to control movement of the vehicle.

2. The vehicle operator condition monitoring system as recited in claim 1, wherein the physical condition monitoring unit comprises a camera and the data processing system comprises instructions for monitoring the facial characteristics and expressions of the vehicle operator.

3. The vehicle operator condition monitoring system as recited in claim 1, wherein the physical condition monitoring unit comprises at least one of a blood pressure monitor, a heart rate monitor, a blood sugar monitor, a respiratory rate monitor, a body temperature monitor, an eye movement monitor, and a pupil dilation monitor.

4. The vehicle operator condition monitoring system as recited in claim 1, wherein the data processing system comprises facial recognition software and wherein the vehicle operator condition monitoring system further comprises:
    a theft deterrent system functionally coupled to the data processing system allowing the data processing system to control operation of the vehicle; wherein the data processing system comprises instructions for alerting a law enforcement agency in the event that the facial characteristics of the vehicle operator do not match those of an authorized operator.

5. A method for monitoring the condition of a vehicle operator, the method comprising:
    monitoring the physical condition of the vehicle operator;
    determining whether the condition of the vehicle driver warrants intervention by a monitoring system; responsive to a determination that the vehicle operator's condition warrants intervention, performing an action appropriate to the condition of the vehicle operator; and
    removing control of the vehicle from the vehicle operator and allowing a vehicle piloting system to control movement of the vehicle.

6. The method as recited in claim 5, wherein the action performed by the monitoring system comprises one of rousing the vehicle operator with an appropriate stimuli; determining a location of a nearby rest area and providing the vehicle operator with directions to the nearby rest area; determining an identity of a nearby hotel, making reservations, and directing the vehicle operator to the hotel; requesting the services of an emergency response agency and notifying the agency with the location of the vehicle; and controlling operation of the vehicle.

7. The method as recited in claim 5, wherein the monitoring of the physical condition of the vehicle operator comprise monitoring facial characteristics and expressions of the vehicle operator.

8. The method as recited in claim 7, further comprising:
    responsive to a determination that the physical facial characteristics of the vehicle operator do not match the physical facial characteristics of an authorized operator of the vehicle, performing theft deterrence activities.

9. The method as recited in claim 8, wherein the theft deterrence activities comprise at least one of alerting an appropriate law enforcement agency, notifying the appropriate law enforcement agency with the location of the vehicle, disabling the vehicle, and locking the doors to prevent the vehicle operator from escaping from the vehicle.

10. A computer program product in a computer readable media for use in a data processing system for monitoring the condition of a vehicle operator, the computer program product comprising:
    first instructions for monitoring the physical condition of the vehicle operator;
    second instructions for determining whether the condition of the vehicle driver warrants intervention by a monitoring system;
    third instructions for performing, responsive to a determination that the vehicle operator's condition warrants intervention, an action appropriate to the condition of the vehicle operator; and fourth instructions for removing control of the vehicle from the vehicle operator and allowing a vehicle piloting system to control movement of the vehicle.

11. The computer program product as recited in claim 10, wherein the action performed by the monitoring system comprises one of rousing the vehicle operator with an appropriate stimuli; determining a location of a nearby rest area and providing the vehicle operator with directions to the nearby rest area; determining an identity of a nearby hotel, making reservations, and directing the vehicle operator to the hotel; requesting the services of an emergency response agency and notifying the agency with the location of the vehicle; and controlling operation of the vehicle.

12. The computer program product as recited in claim 10, wherein the monitoring of the physical condition of the vehicle operator comprises monitoring facial characteristics and expressions of the vehicle operator.

13. The computer program product as recited in claim 12, further comprising:
   fifth instructions for performing, responsive to a determination that the physical facial characteristics of the vehicle operator do not match the physical facial characteristics of an authorized operator of the vehicle, theft deterrence activities.

14. The computer program product as recited in claim 13, wherein the theft deterrence activities comprise at least one of alerting an appropriate law enforcement agency, notifying the appropriate law enforcement agency with the location of the vehicle, disabling the vehicle, and locking the doors to prevent the vehicle operator from escaping from the vehicle.

15. A system for monitoring the condition of a vehicle operator, the system comprising:
   first means for monitoring the physical condition of the vehicle operator;
   second means for determining whether the condition of the vehicle driver warrants intervention by a monitoring system; and
   third means for performing, responsive to a determination that the vehicle operator's condition warrants intervention, an action appropriate to the condition of the vehicle operator; and
   fourth means for removing control of the vehicle from the vehicle operator and allowing a vehicle piloting system to control movement of the vehicle.

16. The system as recited in claim 15, wherein the action performed by the monitoring system comprises one of rousing the vehicle operator with an appropriate stimuli; determining a location of a nearby rest area and providing the vehicle operator with directions to the nearby rest area; determining an identity of a nearby hotel, making reservations, and directing the vehicle operator to the hotel; requesting the services of an emergency response agency and notifying the agency with the location of the vehicle; and controlling operation of the vehicle.

17. The system as recited in claim 16, wherein the monitoring of the physical condition of the vehicle operator comprises monitoring facial characteristics and expressions of the vehicle operator.

18. The system as recited in claim 17, further comprising:
   fifth means for performing, responsive to a determination that the physical facial characteristics of the vehicle operator do not match the physical facial characteristics of an authorized operator of the vehicle, theft deterrence activities.

19. The system as recited in claim 18, wherein the theft deterrence activities comprise at least one of alerting an appropriate law enforcement agency, notifying the appropriate law enforcement agency with the location of the vehicle, disabling the vehicle, and locking the doors to prevent the vehicle operator from escaping from the vehicle.

* * * * *